US006993465B2

(12) United States Patent
Bushel et al.

(10) Patent No.: US 6,993,465 B2
(45) Date of Patent: Jan. 31, 2006

(54) SEQUENTIAL-CORRELATIONAL METHOD OF EVALUATION OF PROBABILISTIC CHARACTERISTICS OF A HIERARCHICAL FUNCTIONAL STRUCTURE

(75) Inventors: Alexander Bushel, Fair Lawn, NJ (US); Arkadi Relin, Langhorne, PA (US)

(73) Assignee: Ultimate Risk Solutions LLC., Fairlawn, NJ (US)

( * ) Notice: Subject to any disclaimer, the term of this patent is extended or adjusted under 35 U.S.C. 154(b) by 0 days.

(21) Appl. No.: 10/424,643

(22) Filed: Apr. 28, 2003

(65) Prior Publication Data

US 2004/0215427 A1 Oct. 28, 2004

(51) Int. Cl.
*G06F 17/10* (2006.01)

(52) U.S. Cl. .......................................................... 703/2

(58) Field of Classification Search .................... 703/2, 703/6

See application file for complete search history.

(56) References Cited

U.S. PATENT DOCUMENTS 5,819,068 A * 10/1998 Hasse ............................ 703/6
5,850,538 A * 12/1998 Steinman .................... 703/2.1
6,173,241 B1 * 1/2001 Trimberger .................. 703/13

* cited by examiner

*Primary Examiner*—Hugh Jones
(74) *Attorney, Agent, or Firm*—Gottlieb, Rackman & Reisman

(57) ABSTRACT

Sequential-correlational method of evaluation of probabilistic characteristics of a hierarchical functional structure comprising structural elements described by respective mathematical models of structural elements, that include input and output parameters, and dependencies between structural elements described by respective mathematical models of dependencies between structural elements, that include input and output parameters. In the method in order to implement the process of executing simulation steps the following is performed: generating random values of variable input parameters of mathematical models of the structural elements, in each simulation step, according to the specified rules of their variability, and determining the values of output parameters of the mathematical models of the structural elements taking into account the output parameters of linked to said structural elements mathematical models of dependencies between structural elements, in each simulation step; accumulating the simulation information about the values of output parameters of the said mathematical models of structural elements, and evaluating the probabilistic characteristics of said structural elements upon completion of all simulation steps utilizing the said accumulated simulation information.

6 Claims, 1 Drawing Sheet

Figure 1:
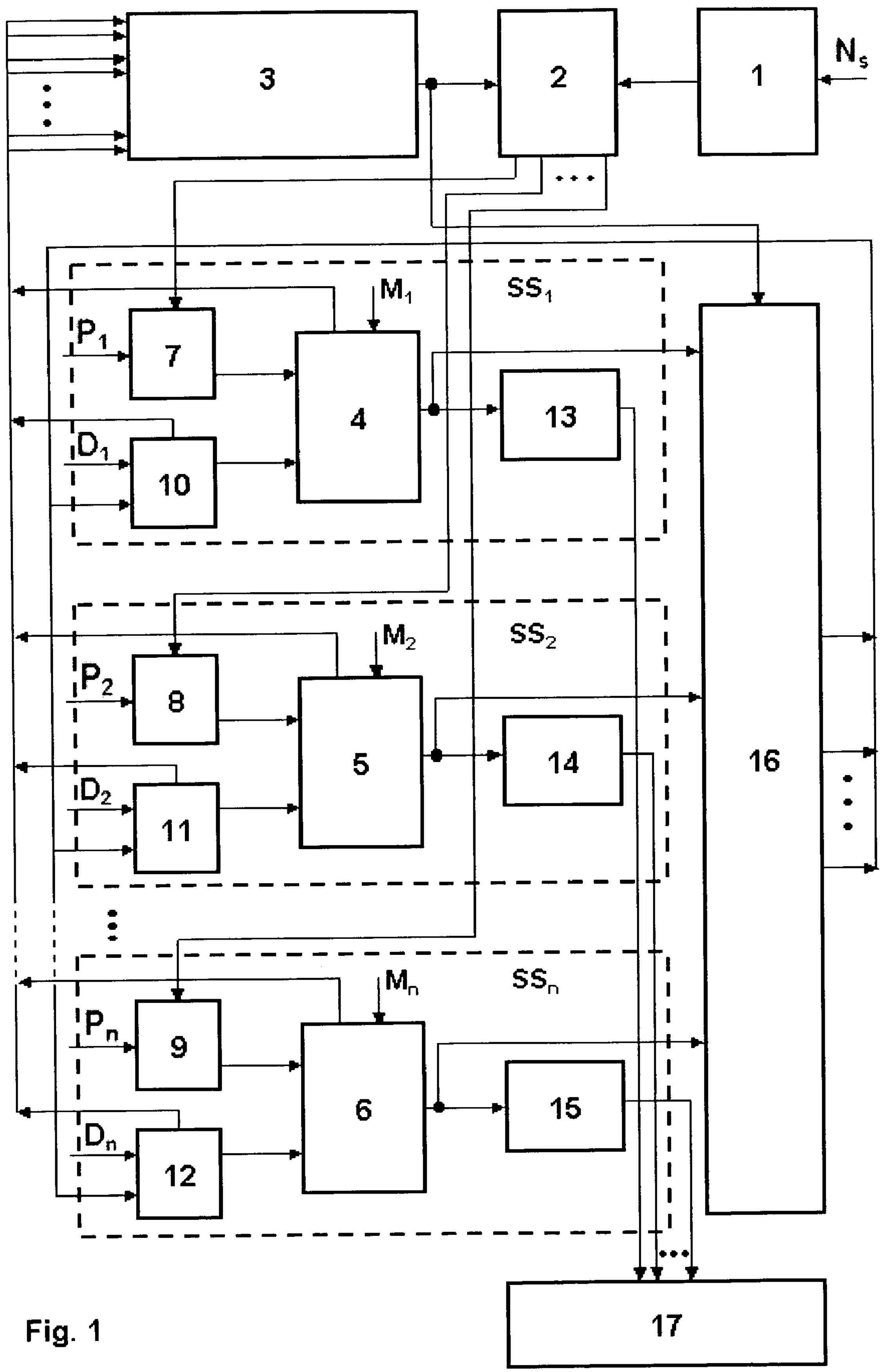

SEQUENTIAL-CORRELATIONAL METHOD OF EVALUATION OF PROBABILISTIC CHARACTERISTICS OF A HIERARCHICAL FUNCTIONAL STRUCTURE

TECHNICAL FIELD

This invention relates to methods and systems of evaluation of probabilistic characteristics of hierarchical functional structures, such as various financial, commercial, technical (i.e., electromechanical) and other similar branching structures composed of structural elements and dependencies between them.

BACKGROUND ART

Various sequential methods are known for evaluation of probabilistic characteristics of hierarchical functional structures, as well as the systems for implementation of the above methods. The above methods use mathematical models of the structural elements of such structures, that include input and output parameters, as well as the mathematical models of dependencies between structural elements, that include input and output parameters. In this case, the evaluation of probabilistic characteristics is performed by implementing the process of executing simulation steps, the process which includes:

- generating the random values of the variable input parameters of the mathematical models of structural elements, in each simulation step, according to the specified rules of their variability, and
- determining the values of output parameters of the mathematical models of structural elements taking into account the output parameters of linked to the structural elements mathematical models of dependencies between structural elements, in each simulation step,
- accumulating the simulation information about the values of output parameters of the mathematical models of the structural elements, and
- evaluating the probabilistic characteristics of the structural elements upon completion of all simulation steps using the accumulated simulation information.

The disadvantages of such methods and systems are:

- difficulty to attain required accuracy of evaluation of probabilistic characteristics of hierarchical functional structures in the process of executing simulation steps, and
- difficulty to simultaneously attain both integral and differential evaluation of probabilistic characteristics of such structures by the known methods.

SUMMARY OF THE INVENTION

These disadvantages are due to the fact that the prior art methods do not allow optimization of priority order of structural elements in each simulation step and also to the fact that the prior art methods do not take into account the dependencies between the elements of a hierarchical structure and varying parameters of elements in the dynamic process of executing simulation steps.

The above listed disadvantages of known methods and systems of evaluation of probabilistic characteristics of hierarchical functional structures considerably reduce the efficiency and limit the areas of their application for solving a wide variety of similar problems.

The present invention introduces a sequential-correlational method of evaluation of probabilistic characteristics of a hierarchical functional structure (SC Method) and the system utilizing the method that open radically new opportunities for solving such problems, which is achieved through the use of new principles of selection of priority order of structural elements as well as through the accumulation of simulation information for each structural element and inputting such information into the models of dependencies of the corresponding subsequent simulated structural element during the process of executing simulation steps.

In order to implement the process of executing simulation steps, the illustrative embodiment selection of priority order of structural elements includes:

- identifying the input and output parameters of mathematical models of structural elements and the input and output parameters of the mathematical models of dependencies between structural elements;
- determining the sequential interdependence between the input and output parameters of all the mathematical models;
- determining the priority order of structural elements based on the analysis of the sequential interdependence, and
- memorizing the priority order of structural elements.

Also, in each simulation step, determining the values of output parameters of the mathematical model of each structural element is performed in the priority order memorized as a result of the selection of priority order of structural elements.

In each simulation step, when determining the output parameters of the mathematical model of each subsequent in the priority order structural element, the determined values of output parameters of mathematical models of preceding in the priority order structural elements are inputted into all mathematical models of dependencies linking the preceding structural elements with the subsequent structural element.

Implementation of selection of priority order of simulations of structural elements may be performed in any of the three modes: prior to commencement of executing simulation steps; prior to commencement of executing each simulation step, or during the process of executing each simulation step.

DETAILED DESCRIPTION OF THE INVENTION

FIG. 1 shows one version of a typical block diagram of the functional construction of the system for the evaluation of probabilistic characteristics of a hierarchical functional structure utilizing the SC Method. The system contains a Simulation Steps Assignment Unit 1, which has assignment input and output connected to one of the inputs of Control Unit 2. The second input of Unit 2 is connected to the output of Selection Unit 3, which has n paired data inputs. The system also contains n standard functionally organized subsystems $SS_1, SS_2, \ldots, SS_n$, respectively reflecting structural organization of standard structural units, which correspond to first, second and n-th structural elements of the hierarchical functional structure. The analogous subsystems $SS_1$, $SS_2, \ldots, SS_n$ contain: Units of Models of Structural Elements, respectively 4, 5 and 6, corresponding to first, second and n-th structural element of the hierarchical functional structure; Units of Input Parameters, respectively 7, 8 and 9; Units of Models of Dependencies, respectively 10, 11 and 12; as well as Simulation Information Accumulation Units, respectively 13, 14 and 15. Moreover, the system, which utilizes the SC Method, contains the Simulation Information Input Unit 16, and Probabilistic Characteristics Evaluation Unit 17. Each of the Units of Input Parameters 7, 8, and 9 has: the assignment input; the start input, connected to one of the outputs of Control Unit 2; as well as the output, connected to the parameters input of the corresponding Units of Models of Structural Elements 4, 5 and 6. Each of the Units of Models of Dependencies, respectively, 10, 11 and 12, has: the assignment input, the data input and the data output, as well as the output connected to the dependency input of the corresponding Units of Models of Structural Elements 4, 5 and 6. Each of the Units 4, 5, and 6 also has: the assignment input, the data output and the output. The output of each of the Units 4, 5 and 6 is connected to the input of its corresponding Simulation Information Accumulation Unit, respectively, 13, 14 and 15, and is also connected to its corresponding input of Simulation Information Input Unit 16. The outputs of Unit 16 are connected to their corresponding data inputs of Units 10, 11 and 12. Unit 16 also has a selection input connected to the output of Selection Unit 3. Data inputs of the Selection Unit 3 are connected to their corresponding data outputs of units 4, 5, 6 and 10, 11, 12. The outputs of Simulation Information Accumulation Unit 13, 14 and 15 are connected to the inputs of Probabilistic Characteristics Evaluation Unit 17.

The introduced SC Method of evaluation of probabilistic characteristics of a hierarchical functional structure is implemented in the described typical block diagram of the functional construction of the system as follows.

Prior to the commencement of the process of executing simulation steps, mathematical models of structural elements of the hierarchical functional structure are inputted into the Units of Models of Structural Elements, respectively, 4, 5 and 6. Mathematical models, respectively $M_1$, $M_2, \ldots, M_n$, corresponding to the structural elements are inputted into the units 4, 5 and 6 through their respective assignment inputs. Through the assignment inputs of the Units of Input Parameters, respectively, 7, 8 and 9, the rules of variability of input parameters ($P_1, P_2, \ldots, P_n$) of the mathematical models of structural elements, respectively, $M_1, M_2, \ldots, M_n$, are inputted. Moreover, the mathematical models of dependencies ($D_1, D_2, \ldots, D_n$) between respective structural elements of the hierarchical functional structure, the probabilistic characteristics of which are being evaluated, are inputted through the assignment inputs of the Units of Models of Dependencies, respectively, 10, 11 and 12.

Prior to the commencement of executing simulation steps, the multifunctional Selection Unit 3 processes information about the input and output parameters of the mathematical models of structural elements ($M_1, M_2, \ldots, M_n$) and about the input and output parameters of the mathematical models of dependencies between the structural elements ($D_1$, $D_2, \ldots, D_n$). The information is channeled to the Selection Unit 3 through n paired data inputs, connected to their corresponding data outputs of Units 4, 5, 6 and 10, 11, 12. As a result of processing the input and output parameters, the Selection Unit 3 determines sequential interdependence between the input and output parameters of all the mathematical models. After this, the Unit 3 determines the priority order of structural elements based on the analysis of the sequential interdependence and memorizes the priority order of the structural elements in such a way that, in each simulation step, determining the values of output parameters of the mathematical model of each structural element is to be performed in priority order memorized as a result of the selection of priority order of structural elements.

After completing the selection of priority order of structural elements, Unit 3, through its output, sends a command, respectively, to the input of Control Unit 2 and to the selection input of Simulation Information Input Unit 16. At the same time, Control Unit 2, having received the command about the commencement of executing simulation steps from the output of Simulation Steps Assignment Unit 1, begins to implement the process of executing simulation steps. The number of simulation steps $N_s$ is set at the assignment input of Unit 1 prior to the commencement of executing simulation steps.

In each simulation step, from the outputs of control unit 2 the commands are sent sequentially to the start input of Units of Input Parameters, respectively, 7, 8 and 9. The priority order of sending such commands is determined by the priority order of structural elements memorized in the Selection Unit 3. The commands sent to the start input of the Units 7,8 and 9 sequentially start the generation of random values of variable input parameters of one of the corresponding mathematical models of structural elements $M_1, M_2, \ldots$, $M_n$. The Units of Input Parameters 7, 8 and 9 contain the generators of random numbers that provide the generation of random values of variable input parameters of corresponding mathematical models of structural elements upon the start command from Unit 2, and according to specified rules of variability of input parameters ($P_1, P_2, \ldots, P_n$) of the mathematical models of structural elements. With this, from the outputs of Units 7, 8 and 9 the information about the modified values of input parameters is sent to the parameters input of, respectively, Units 4, 5 and 6 and the information is taken into account in respective mathematical models ($M_1, M_2, \ldots, M_n$) of the Units 4, 5 and 6. The models also take into account the information about the output parameters of respective models of dependencies ($D_1, D_2, \ldots$, $D_n$), which is delivered to the Units 4, 5 and 6, to their dependency input from the outputs of the Units 10, 11 and 12, respectively. In the Units of Models of Structural Elements, respectively, 4, 5 and 6, the values of output parameters of the mathematical models, respectively, $M_1, M_2, \ldots$, $M_n$, of the structural elements are determined taking into account the output parameters of mathematical models of dependencies between the structural elements linked to the Units 4, 5 and 6. The start of determining the values of the output parameters is determined by the delivery to the parameters input of the Units 4, 5 and 6 of the modified values of input parameters randomly generated in one of the corresponding Units 7, 8 and 9 upon the start command from the Control Unit 2. Since the start commands are delivered from the Control Unit 2 in the priority order determined by Selection Unit 3, determining the values of output parameters in Units 4, 5 and 6 takes place in the same priority order. The values of output parameters from Units 4, 5 and 6 are sent in the priority order to the inputs of Simulation Information Accumulation Units, respectively, 13, 14 and 15. At the same time, the information about the values of output parameters of the mathematical models of structural elements $M_1, M_2, \ldots, M_n$ is delivered to the inputs of Simulation Information Input Unit 16 in the same established priority order. Unit 16 provides the input of determined values of output parameters of one (or several) the mathematical model (or mathematical models) $M_1, M_2, \ldots$, $M_n$ corresponding to the preceding in the priority order structural element (or preceding in the priority order structural elements) to one of the data inputs of one of the Units of Models of Dependencies 10, 11 and 12. Unit 16 determines the address (or addresses) of the input of the information taking into account the knowledge of the established priority order of structural elements, the information about which is delivered to its selection input from the Selection Unit 3. Therefore, the information from the Unit 16 is delivered to the data input of the Unit of Models of Dependencies of that subsystem ($SS_1$, $SS_2$, . . . , or $SS_n$) which corresponds to the subsequent in the established priority order structural element. The Simulation Information Accumulation Units, respectively, 13, 14 and 15, in the established priority order of simulations of structural elements, accumulate the simulation information about the values of output parameters of mathematical models of their corresponding structural elements.

Analogous operations are performed by the above system during each consecutive simulation step, the number of such steps being set by the command from the Simulation Steps Assignment Unit 1 to the input of Control Unit 2. In each simulation step, when determining the values of output parameters of the mathematical model of each subsequent in established priority order structural element, the determined values of output parameters of the mathematical models of the preceding in established priority order structural elements are inputted into all mathematical models of dependencies linking the preceding structural elements with the subsequent structural element. The simulation information accumulated in Units 13, 14 and 15 is continuously delivered into the inputs of Probabilistic Characteristics Evaluation Unit 17. Unit 17 ensures the possibility of evaluation of probabilistic characteristics of the structural elements of the hierarchical functional structure upon completion of execution of all simulation steps using the accumulated simulation information and also provides the possibility of supplying digital or graphical information about the probabilistic characteristics.

If the hierarchical functional structure being analyzed has more complex branching dependencies between structural elements, it may become necessary to adjust the priority order of simulations of structural elements, both prior to executing each simulation step, as well as to utilize a more complex solution—adjusting the priority order during the execution of each simulation step. In this case, the simulation information will be taken into account through instant correction of the priority order. To ensure the above priority order adjustments, the system of evaluation of probabilistic characteristics of such hierarchical functional structure may include additional functional features in the Selection Unit 3 to set up and implement other above mentioned modes of selection process. In this case, a feedback should be provided from Control Unit 2 to Selection Unit 3 to ensure that Unit 3 can obtain the current information about the execution or completion of the simulation step.

The main principal essential distinctions of the above described system, which utilizes SC Method, are the introduction of multifunctional Selection Unit 3 of the priority order of simulations of structural elements of the hierarchical functional structure and the introduction of Simulation Information Input Unit 16. The presence of the new functional units and their functional relationships with other functional units of the system makes it possible to implement principally new methodological steps in the introduced sequential-correlational method of evaluation of probabilistic characteristics of a hierarchical functional structure. It is the capabilities of Selection Unit 3 that predetermine ensuring, in each simulation step, of the efficient sequence of simulations of structural elements of a hierarchical functional structure. At the same time, the functional capabilities of Simulation Information Input Unit 16 and its functional relationships with the corresponding Units 10, 11 and 12 predetermine the possibility of ensuring and taking into account the correlational links between the structural elements in a dynamic process of executing simulation steps. The above the predetermines, in general, the sequential-correlational nature of the introduced new SC Method during the evaluation of probabilistic characteristics of any hierarchical functional structure.

Thus, the use of the above new methodological techniques in the structural implementation of the systems for evaluation of probabilistic characteristics of a hierarchical functional structure makes it possible to obtain the evaluations of not only differential, but also integral probabilistic characteristics of such structures and also to substantially increase the accuracy of such evaluations through the use of new approaches that ensure the effective selection of the priority order of structural elements and dynamic accounting of dependencies between the structural elements as well as the current simulation information during the process of executing simulation steps. Such systems utilizing the introduced SC Method open up radically new possibilities and considerably expand the fields of the application of such systems in addressing a wide spectrum of complex problems related to the need of evaluation of probabilistic characteristics of branching hierarchical structures.

We claim:

1. A computer implemented sequential-correlational method of evaluation of probabilistic characteristics of a hierarchical functional structure comprising structural elements described by respective mathematical models of structural elements, that include input and output parameters, and dependencies between structural elements described by respective mathematical models of dependencies between structural elements, that include input and output parameters; through the implementation of the process of executing simulation steps, the process which includes:

generating random values of variable input parameters of mathematical models of the structural elements, in each simulation step, according to the specified rules of their variability, and determining the values of output parameters of the mathematical models of the structural elements taking into account the output parameters of linked to the structural elements mathematical models of dependencies between structural elements, in each simulation step;

accumulating the simulation information about the values of output parameters of the mathematical models of structural elements, and evaluating the probabilistic characteristics of the structural elements upon completion of all simulation steps utilizing the accumulated simulation information; wherein, to implement the process of executing simulation steps, the selection of priority order of structural elements takes place, the selection which includes:

identifying the input and output parameters of the mathematical models of the structural elements and the input and output parameters of the mathematical models of dependencies between structural elements;

determining the sequential interdependence between the input and output parameters of all the mathematical models;

determining the priority order of structural elements based on the analysis of the sequential interdependence;

memorizing the priority order of structural elements;

and, in each simulation step, determining the values of output parameters of the mathematical model of each structural element is performed in the priority order memorized as a result of the selection of priority order of structural elements; where, in each simulation step, when determining the output parameters of the mathematical model of each subsequent in the priority order structural element, the determined values of output parameters of mathematical models of the preceding in the priority order structural elements are inputted into all mathematical models of dependencies linking the said preceding structural elements with the said subsequent structural element.

2. The computer implemented method of claim 1 wherein the selection of the priority order of structural elements is performed prior to commencement of executing simulation steps.

3. The computer implemented method of claim 1 wherein the selection of the priority order of structural elements is performed prior to commencement of executing each simulation step.

4. The computer implemented method of claim 1 wherein the selection of the priority order of structural elements is performed during the process of executing each simulation step.

5. A computer implemented sequential-correlational method for the evaluation of probabilistic characteristics of a hierarchical functional structure having structural elements, comprising inputting mathematical models of the structural elements of the hierarchical functional structure into units of models of structural elements, values of input parameters to the parameters input of units of models of structural elements, receiving a start command from the control unit and determining in the units of models of structural elements the values of output parameters of the mathematical models by delivery to the parameters input of the unit of model of structural elements modified values of input parameters randomly generated in a unit of input parameters, sending in the priority order values of output parameters from units of models of structural elements to the inputs of simulation information accumulation units, providing from a simulation information impact unit determined values of output parameters of a mathematical model to a data input of a unit of models of dependencies, delivering simulation information from the simulation information impact unit to the data input of the unit of models of dependencies and accumulating that information in simulation information accumulation units, delivering the accumulated information to the inputs of a probabilistic characteristics evaluation unit, Wherein in each simulation step, determining the values of output parameters of the mathematical model of each structural element is performed in the priority order memorized as a result of the selection of priority order of structural elements; where, in each simulation step, when determining the output parameters of the mathematical model of each subsequent in the priority order structural element, the determined values of output parameters of mathematical models of the preceding in the priority order structural elements are inputted into all mathematical models of dependencies linking the said preceding structural elements with the said subsequent structural element.

6. The computer implemented sequential-correlational method for the evaluation of probabilistic characteristics of a hierarchical functional structure having structural elements of claim 5 further comprising adjusting in the control unit the priority order of simulations of structural elements prior to or during the execution of each simulation step.

* * * * *